Sept. 11, 1951 G. B. BENANDER 2,567,686
ELECTRIC LAMP SOCKET
Filed Feb. 14, 1948

Inventor:
George B. Benander,
by Alfred E. Pobst.
His Attorney.

Patented Sept. 11, 1951

2,567,686

UNITED STATES PATENT OFFICE 2,567,686

ELECTRIC LAMP SOCKET

George B. Benander, Oaklawn, R. I., assignor, by mesne assignments, to General Electric Company, a corporation of New York Application February 14, 1948, Serial No. 8,470

1 Claim. (Cl. 173—328)

This application is a continuation-in-part of my application Serial No. 718,166, filed December 24, 1946, now Patent No. 2,483,120, issued September 27, 1949.

The invention relates to electric lamp sockets of the screw-shell type comprising a casing formed from a suitable molding compound split longitudinally to provide two complementary halves or parts between which the contact parts are held and within which they are housed.

My invention may be embodied in lamp sockets which do or do not have switch mechanisms therein.

The primary object of the invention is to provide an improved arrangement for connecting together the two halves or parts of the casing wherein the halves are fastened together, at least in part, by a supporting member or bracket for the socket.

Other objects and advantages of my invention will appear from the following specification.

For a consideration of what I believe to be novel and my invention, attention is directed to the following specification and to the claim appended thereto.

Figure 1:
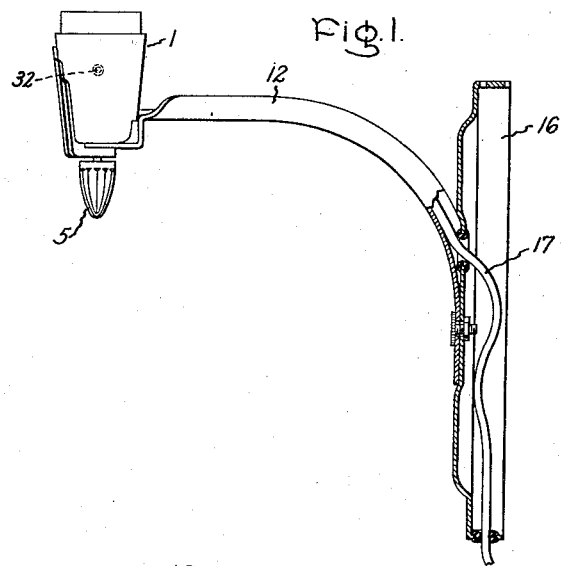
Figure 2:
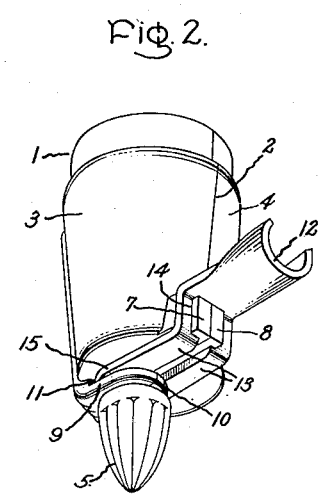
Figure 3:
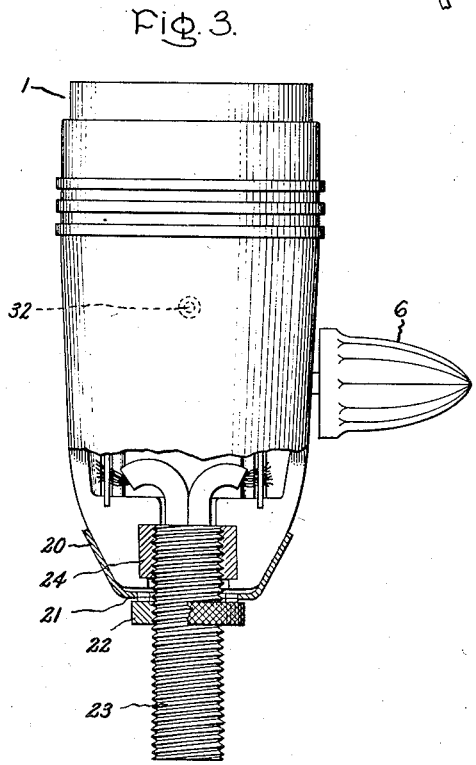

In the drawing, Fig. 1 is a side elevation, partly in section, of a lamp socket embodying my invention; Fig. 2 is a perspective view on a larger scale of the lamp socket of Fig. 1; Fig. 3 is a side view, partly broken away, of a second embodiment of my invention; and Fig. 4 is a view partly in section of the modification shown in Fig. 3.

Figure 4:
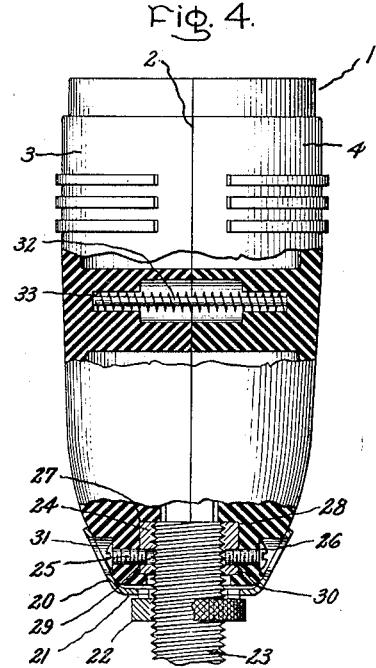

Referring first to Figs. 1 to 4 of the drawing, 1 indicates a screw-shell lamp socket, the casing of which is split longitudinally as indicated at 2 whereby the casing is formed in two parts or halves 3 and 4. The casing houses contact parts which may be of any suitable construction. In Figs. 1 and 2, the casing is indicated as housing contact parts including switch mechanism actuated by a switch button 5 which projects from the bottom of the casing. In Figs. 3 and 4, the casing is indicated as housing contact parts including switch mechanism actuated by a switch button 6 which projects from the side of the casing. The two structures shown are to be taken as typical of longitudinally split screw-shell lamp sockets in connection with which my invention may be used.

My invention has to do particularly with arrangements for fastening together what may be termed the lower ends of the casings.

According to the form of my invention shown in Figs. 1 and 2, the side wall of the casing at its lower end is provided with walls which define projections 7 and 8, projection 7 being on casing part 3 adjacent the edge of the casing part 3, and projection 8 being similarly positioned on casing part 4. The two projections preferably abut each other and are rectangular in outline. On the bottom of casing 1 are projections 9 and 10, the projection 9 being on casing part 3 and the projection 10 being on casing part 4. They are located adjacent the split in the casing and are shaped to define a generally semi-circular groove 11 which extends around the two parts of the casing beneath its lower end. The projections 7, 8 and groove 11 are adapted to receive a holding means for fastening together the lower end of casing 1. This holding means may form a part of a bracket 12 for supporting the lamp socket. It comprises an arm which may be semi-circular in cross-section and which is provided at its free end with a fork 13 the two tines of which define an opening 14 which fits over projections 7 and 8 and fingers 15 which fit in groove 11. The tines 13 intermediate their ends are bent at a right angle to provide a right angle portion in which opening 14 is located and a straight portion which fits beneath casing 3. The tines fit snugly around the projections 7 and 8 and in the groove 11 to firmly hold together the casing parts.

Bracket 12, in the present instance, is shown as being the bracket of what is termed usually a "pin-up" lamp, it being connected to a wall plate 16. The cord for the pin-up lamp is indicated at 17.

According to the form of my invention shown in Figs. 3 and 4, the casing parts are held together by a collar 20 which surrounds the lower end of the casing and is provided with an inturned flange 21 positioned between the bottom of the casing and a nut 22 carried by a threaded thimble 23, the thimble in turn being attached to the lower end of the casing. By turning nut 22 up tight against flange 21, the collar is forced up around the lower end of the casing to tightly clamp the two casing parts together. Thimble 23 serves as a supporting means for mounting the lamp socket on a bracket or the like. The thimble 23 may be threaded into an internally threaded ring or collar 24 positioned in grooves 27 and 28 in the two casing parts, the two grooves together forming one continuous groove. The thimble 23 is thus locked into position simultaneously with the collar 20 by the nut 22.

In lieu of collar 20 or in addition thereto, I may provide screws 25 and 26 for fastening together the lower ends of the casing parts in conjunction with the ring 24. Screws 25 and 26 extend through openings 29 and 30 in the casing parts and thread into tapped openings in ring 24, collar 20 being provided with openings 31 in line with openings 29 and 30. The arrangement is such that screw 25 when screwed down tight does not extend entirely through ring 24, but screw 26 when screwed down tight does extend through ring 24 and serves as a setscrew for fixing thimble 23 in the ring. Openings 29 and 30 are provided with shoulders against which the heads of screws 25 and 26 are positioned. The desired result may be obtained by using screws 25 and 26 of different lengths or, as shown in the drawing, by using screws of the same length and making the shoulder in the one opening (i. e. opening 30) nearer to ring 24 than the shoulder in the other opening. In assembling the lamp socket, ring 24 may be attached to the one casing part by the screw 25 which may be screwed down tight whereby the ring is firmly attached to such casing part. Thereafter, after the various parts have been assembled in the one casing part, the other casing part may be positioned on such one casing part and, after the socket has been threaded onto thimble 23, the screw 26 may be screwed down tight to fasten the lower ends of the casing parts together and fix the socket on thimble 23.

The foregoing arrangement whereby the one screw 25 is utilized to fasten the ring to the one casing part and the other screw 26 is used both to fasten the other casing part to the ring and serve as a setscrew for the thimble 23, I consider as being an important feature of my invention in that by means of ring 24 and two screws 25, 26, I am enabled to fasten together the two casing parts and at the same time utilize one of the screws as a setscrew. In other words, by this feature of my invention, I am enabled to make the one screw 26 perform two functions. As stated above, I may, if desired, dispense with collar 20, thus utilizing the ring 24 and the two screws 25 and 26 alone as the means for holding the lower end of the two casing parts together.

The upper ends of the two casing parts may be held together in any suitable way. In the present instance, I have shown them fastened together by means of a threaded pin 32 forced into openings 33 in the two casing parts as shown clearly in Fig. 4.

What I claim as new and desire to secure by Letters Patent of the United States is:

A lamp socket having a casing split longitudinally to divide it into complementary casing portions, each of said portions defining an axially extending semi-annular groove, a supporting member, a ring positioned in said groove, said ring defining an axially extending bore for engaging said supporting member, said ring further having a pair of oppositely disposed radially extending threaded bores, and means for securing said casing portions together and to said ring comprising threaded elements passing one through each of said casing portions to secure it to one of said oppositely disposed radially extending bores, one of said securing elements passing through one of said oppositely disposed radially extending threaded bores to lock said ring to said supporting member.

GEORGE B. BENANDER.

REFERENCES CITED

The following references are of record in the file of this patent:

UNITED STATES PATENTS

| Number | Name | Date |
|---|---|---|
| 439,367 | Swan | Oct. 28, 1890 |
| 1,034,910 | Greenway | Aug. 6, 1912 |
| 1,151,800 | Klein | Aug. 31, 1915 |
| 2,079,800 | Grant | May 11, 1937 |

FOREIGN PATENTS

| Number | Country | Date |
|---|---|---|
| 298,626 | Germany | Sept. 5, 1916 |
| 372,400 | France | Apr. 4, 1907 |